(12) United States Patent
Esaki (10) Patent No.: US 12,177,372 B2
(45) Date of Patent: Dec. 24, 2024

(54) MOBILE TERMINAL, POWER SUPPLY DEVICE, AND CONTROL METHOD (71) Applicant: SOCIONEXT INC., Kanagawa (JP)

(72) Inventor: Kotaro Esaki, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 1178 days.

(21) Appl. No.: 16/984,548

(22) Filed: Aug. 4, 2020

(65) Prior Publication Data

US 2020/0366771 A1 Nov. 19, 2020

Related U.S. Application Data (63) Continuation of application No. PCT/JP2018/004744, filed on Feb. 9, 2018.

(51) Int. Cl.
*H02J 7/00* (2006.01)
*H02J 50/10* (2016.01)
*H02J 50/90* (2016.01)
*H04M 1/02* (2006.01)

(52) U.S. Cl.
CPC ........... *H04M 1/0262* (2013.01); *H02J 50/10* (2016.02); *H02J 50/90* (2016.02); *H04M 1/0266* (2013.01)

(58) Field of Classification Search
None
See application file for complete search history.

(56) References Cited

U.S. PATENT DOCUMENTS

| | | | |
|---|---|---|---|
| 10,790,703 B2 | 9/2020 | Yoden | |
| 2007/0279002 A1* | 12/2007 | Partovi | G06K 19/0704 320/115 |
| 2011/0163712 A1* | 7/2011 | Chen | H01M 10/488 320/107 |
| 2012/0146579 A1* | 6/2012 | Shukuya | G12B 5/00 320/108 |
| 2013/0099776 A1* | 4/2013 | Wu | H02J 50/10 324/133 |
| 2013/0110424 A1* | 5/2013 | Nagathil | H04B 17/327 702/62 |
| 2016/0157002 A1 | 6/2016 | Chen et al. | |
| 2016/0356464 A1 | 12/2016 | Zhang | |

(Continued)

FOREIGN PATENT DOCUMENTS

| | | |
|---|---|---|
| JP | 2006-203997 A | 8/2006 |
| JP | 2008-118575 A | 5/2008 |
| JP | 2013-169027 A | 8/2013 |

(Continued)

OTHER PUBLICATIONS

International Search Report and Written Opinion issued on Apr. 17, 2018 in International Application No. PCT/JP2018/004744; with English translation.

*Primary Examiner* — Arun C Williams (74) *Attorney, Agent, or Firm* — Rimon P.C.

(57) ABSTRACT

A mobile terminal that operates on a secondary battery, the mobile terminal including: a power receiver that wirelessly receives electric power, and supplies the secondary battery with the electric power received; a display unit that provides a display indicating that the power receiver is receiving the electric power; and a display controller that causes the display unit to provide the display differently in accordance with magnitude of the electric power received by the power receiver.

11 Claims, 7 Drawing Sheets

(56) References Cited

U.S. PATENT DOCUMENTS

2017/0033581 A1    2/2017   Horii

FOREIGN PATENT DOCUMENTS

| | | |
|---|---|---|
| JP | 2013-243792 A | 12/2013 |
| JP | 2015-208093 A | 11/2015 |
| JP | 2016-111696 A | 6/2016 |
| WO | 2009/041059 A1 | 4/2009 |

* cited by examiner

MOBILE TERMINAL, POWER SUPPLY DEVICE, AND CONTROL METHOD

CROSS REFERENCE TO RELATED APPLICATION

This is a continuation application of PCT Patent Application No. PCT/JP2018/004744 filed on Feb. 9, 2018, designating the United States of America. The entire disclosure of the above-identified application, including the specification, drawings and claims is incorporated herein by reference in its entirety.

FIELD

The present disclosure relates to a mobile terminal, a power supply device, and a control method. In particular, the disclosure relates to a mobile terminal that wirelessly receives electric power, a control method for the same, and a power supply device that wirelessly supplies electric power.

BACKGROUND

A wireless power supply device and a wireless power supply system are known that perform non-contact power supply by a magnetic field resonance method utilizing an electromagnetic resonance phenomenon and an electromagnetic induction method utilizing an electromagnetic induction phenomenon.

For example, as disclosed in Patent Literature (PTL) 1, a mobile terminal is charged, for example, by being placed in a predetermined region in a charger, which is a wireless power supply device, even when the mobile terminal is not connected to the charger. PTL 1 also proposes a charger that is implemented as an integrated combination of a wireless power supply device and a wireless device.

CITATION LIST

Patent Literature

PTL 1: Japanese Unexamined Patent Application Publication No. 2008-118575

SUMMARY

Technical Problem

However, PTL 1 describes the capability of charging the mobile terminal by placing it in the predetermined region in the charger, without considering an improvement in the efficiency of charging the mobile terminal. For example, while charging of the mobile terminal itself may be possible, the efficiency of charging (hereinafter also referred to as charging efficiency) can decrease depending on the position of placing the mobile terminal within the predetermined region in the charger. Further, charging of the mobile terminal during data communication, etc. with the charger as disclosed in PTL 1 consumes some of the charged electric power for such data communication. This results in a lower charging efficiency and possibly in longer charging time than necessary.

The present disclosure has been conceived in view of the above circumstances, and its aim is to provide a mobile terminal and so forth capable of further improving the charging efficiency of wireless power supply.

Solution to Problem

The mobile terminal according to one aspect of the present disclosure is a mobile terminal that operates on a secondary battery. Such mobile terminal includes: a power receiver that wirelessly receives electric power, and supplies the secondary battery with the electric power received; a display unit that provides a display indicating that the power receiver is receiving the electric power; and a display controller that causes the display unit to provide the display differently in accordance with magnitude of the electric power received by the power receiver.

Here, for example, the display controller may cause the display unit to provide the display differently when the magnitude of the electric power received by the power receiver exceeds a predetermined value.

Also, for example, the display controller may cause the display unit to provide the display differently between a case where the magnitude of the electric power received by the power receiver is increasing and a case where the magnitude of the electric power is decreasing.

Also, for example, the display unit may provide the display that shows a numerical value representing a relative value that is based on a predetermined magnitude of electric power, and the display controller may cause the display unit to change the numerical value displayed in accordance with the magnitude of the electric power received by the power receiver.

These structures enable the user to move the mobile terminal to the optimal position with respect to the power supply device, in accordance with changes in the display shown by the display unit, thus further improving the charging efficiency of wireless power supply to the mobile terminal.

Also, the mobile terminal according to another aspect of the present disclosure is a mobile terminal that operates on a secondary battery. Such mobile terminal includes: a power receiver that wirelessly receives electric power, and supplies the secondary battery with the electric power received; and a wireless communication unit that performs wireless communication. Here, when the power receiver is receiving the electric power, the wireless communication unit performs the wireless communication using radio waves having a lower radio wave intensity than a predetermined radio wave intensity that is used when the power receiver is not receiving the electric power.

Also, for example, the wireless communication unit may perform the wireless communication using the radio waves having the lower radio wave intensity than the predetermined radio wave intensity, when the power receiver is receiving the electric power and the wireless communication unit is performing the wireless communication with a power supply device that is currently transmitting the electric power to the power receiver.

These structures reduce the electric power consumed by wireless communication, thus preventing a decrease in the charging efficiency. Consequently, the present disclosure prevents the charging time from becoming longer than necessary. The charging efficiency of wireless power supply is thus further improved. Also, reduction in the electric power consumed by wireless communication prevents the occurrence of heat generated by performing wireless communication. Stated differently, the present disclosure also improves the heat radiation effect.

Also, the power supply device according to still another aspect of the present disclosure is a power supply device including: a power transmitter that wirelessly transmits electric power to a mobile terminal; and a wireless communication unit that performs wireless communication. Here, when the power transmitter is transmitting the electric power to the mobile terminal, the wireless communication unit performs the wireless communication using radio waves having a lower radio wave intensity than a predetermined radio wave intensity that is used when the power transmitter is not transmitting the electric power.

Here, for example, the wireless communication unit may perform the wireless communication using the radio waves having the lower radio wave intensity than the predetermined radio wave intensity, when the power transmitter is transmitting the electric power and the wireless communication unit is performing the wireless communication with the mobile terminal.

These structures enable to lower the intensity of radio waves used by the mobile terminal for wireless communication, when the power supply device is performing wireless communication with the mobile terminal. Consequently, the present disclosure reduces the electric power consumed by the mobile terminal for wireless communication. The present disclosure thus prevents the efficiency of charging the mobile terminal from becoming lower and the time taken for charging from becoming longer than necessary. The charging efficiency of wireless power supply to the mobile terminal is thus further improved.

Also, reduction in the electric power consumed by the mobile terminal for wireless communication prevents the occurrence of heat generated by performing wireless communication. Stated differently, the present disclosure also improves the heat radiation effect.

Also, the power supply device according to still another aspect of the present disclosure is a power supply device including: a power transmitter that is located in a body of the power supply device, and wirelessly transmits electric power to a mobile terminal; and a first magnetic body that is located in the body, keeps the mobile terminal levitated at a predetermined position above the body, and has magnetic properties different from magnetic properties of a second magnetic body placed in the mobile terminal. Here, in the body of the power supply device, a position of the power transmitter relative to the first magnetic body is changeable.

This structure enables to move the position of the power transmitter including the power transmitter coil to the optimal position, thus further improving the charging efficiency of wireless power supply to the mobile terminal. Further, since the mobile terminal is charged in a levitated state, the gap between the mobile terminal and the power supply device enables further release of the heat generated in the mobile terminal and the power supply device during the charging of the mobile terminal. Stated differently, this structure promotes the heat radiation effect and thus prevents a decrease in the charging efficiency caused by heat. As described above, the present disclosure further improves the charging efficiency of wireless power supply to the mobile terminal.

Also, the control method according to still another aspect of the present disclosure is a control method of controlling a mobile terminal that operates on a secondary battery. Such control method includes: (i) causing the mobile terminal to wirelessly receive electric power and supply the secondary battery with the electric power received; (ii) causing the mobile terminal to provide a display indicating that the electric power is being received in (i); and (iii) causing the mobile terminal to provide the display differently in accordance with magnitude of the electric power received in (i).

Note that these comprehensive or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Advantageous Effects

The mobile terminal and so forth according to the present disclosure further improve the charging efficiency of wireless power supply.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

The following describes in detail the embodiments according to the present disclosure with reference to the drawings. Note that the following embodiments show a comprehensive illustration of the present disclosure. The numerical values, shapes, materials, structural components, the arrangement and connection of the structural components, usage procedure, communication procedure, etc. shown in the following embodiments are mere examples, and thus are not intended to limit the present disclosure. Of the structural components described in the following embodiments, structural components not recited in any one of the independent claims that indicate the broadest concepts of the present disclosure will be described as optional structural components. Also note that the drawings are not necessarily precise illustrations. Also, substantially the same structural components are assigned the same reference marks throughout the drawings, and their repetitive descriptions will be omitted or simplified.

Embodiment 1

Figure 1:
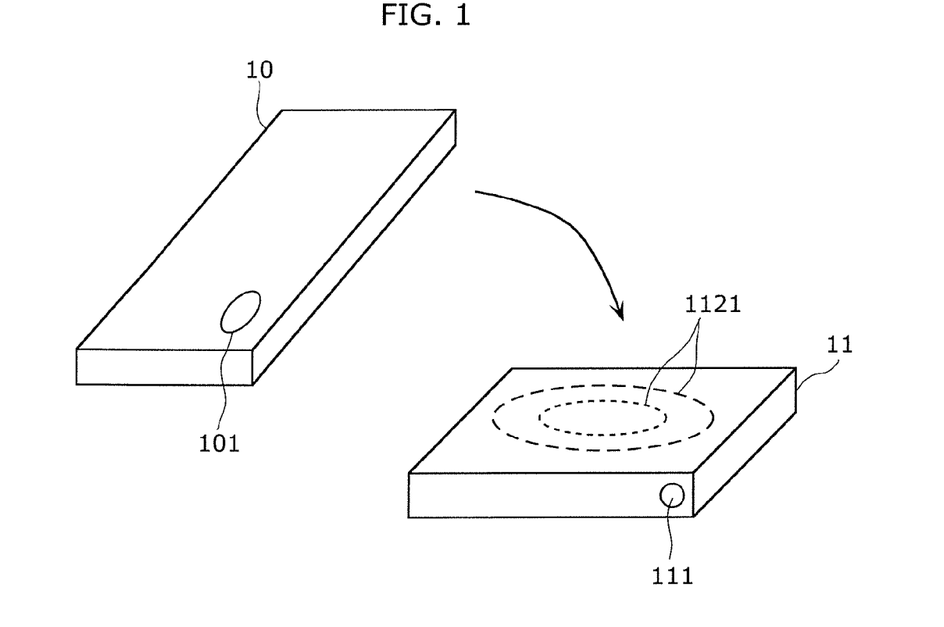
FIG. 1 is a diagram for explaining a method of charging a mobile terminal according to Embodiment 1.

The following describes mobile terminal 10 and power supply device 11 according to Embodiment 1 with reference to the drawings.
[Structure, Etc.]
FIG. 1 is a diagram for explaining a method of charging mobile terminal 10 according to Embodiment 1. As illustrated in FIG. 1, mobile terminal 10 is charged by being placed on the top surface of power supply device 11, without power supply device 11 and mobile terminal 10 being connected (wirelessly charged).
[Mobile Terminal 10]
Mobile terminal 10 operates on a secondary battery. Examples of mobile terminal 10 include, but not limited to, a mobile phone, a smartphone, a tablet, a personal digital assistant (PDA). Mobile terminal 10 may also be a speaker or other electronic devices having the capability of wirelessly receiving electric power transmitted from power transmitter coil 1121 of power supply device 11 by being placed on power supply device 11. Also, mobile terminal 10 is not limited to having a flat plate shape as illustrated in FIG. 1, and thus may have a shape such as a spherical shape and a disk shape. Mobile terminal 10 illustrated in FIG. 1 includes display unit 101 such as an LED that functions as an indicator. Display unit 101 emits light, for example, while mobile terminal 10 is receiving electric power from power supply device 11, i.e., when charging of mobile terminal 10 is in progress, to display such status. Note that display unit 101 is not limited to an LED. This will be described in detail later.

Figure 2:
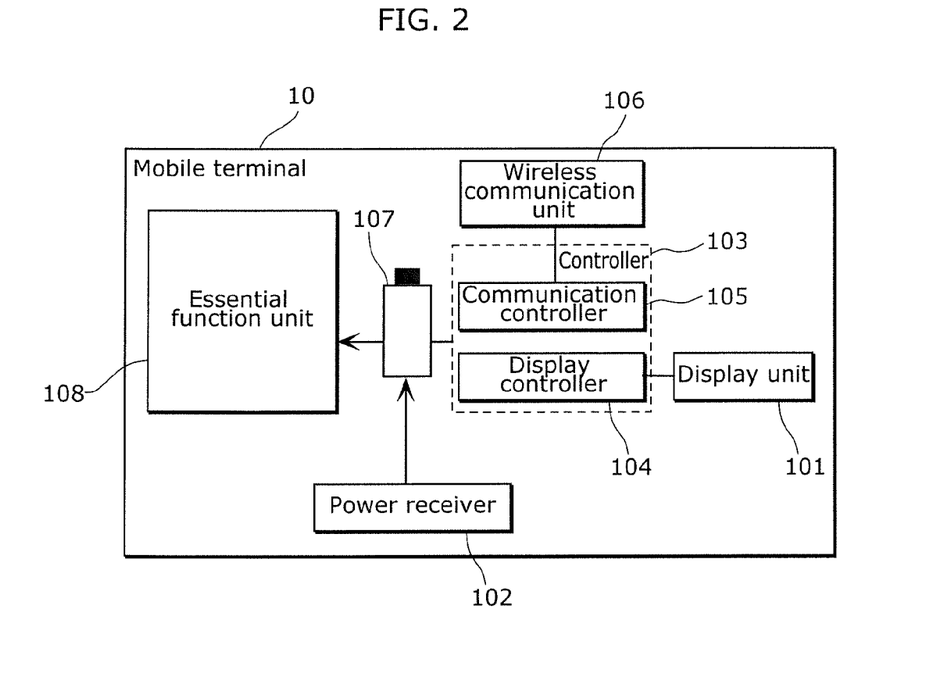
FIG. 2 is a block diagram of an exemplary structure of the mobile terminal according to Embodiment 1.
Figure 3A:
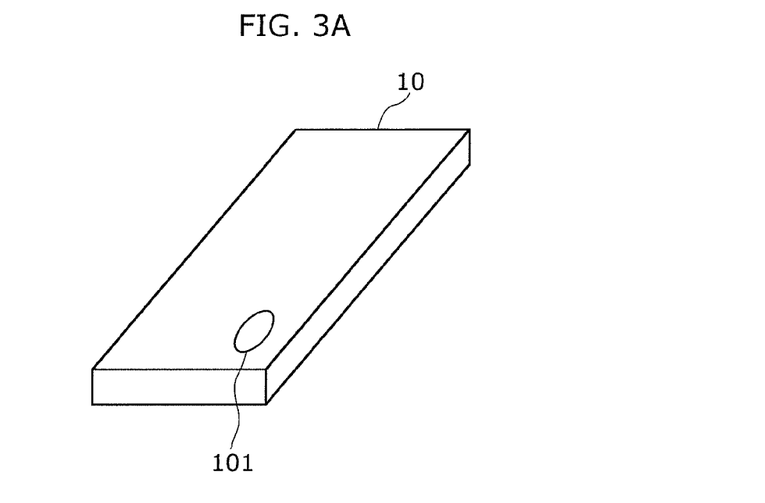
FIG. 3A is a bird's eye view showing an example of a display unit of the mobile terminal according to Embodiment 1.
Figure 3B:
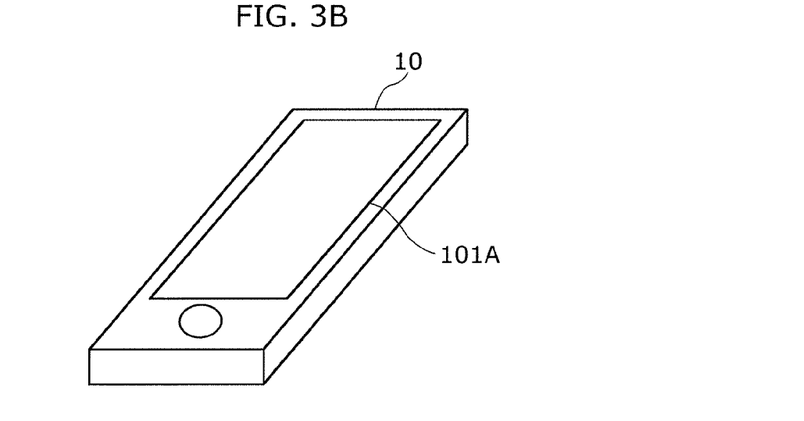
FIG. 3B is a bird's eye view showing an example of a display unit of the mobile terminal according to Embodiment 1.

FIG. 2 is a block diagram of an exemplary structure of mobile terminal 10 according to Embodiment 1. FIG. 3A is a bird's eye view showing an example of display unit 101 of mobile terminal 10 according to Embodiment 1. FIG. 3B is a bird's eye view showing an example of display unit 101A of mobile terminal 10 according to Embodiment 1.

As illustrated in FIG. 2, for example, mobile terminal 10 according to the present embodiment includes display unit 101, power receiver 102, controller 103, wireless communication unit 106, secondary battery 107, and essential function unit 108. Note that display unit 101 and wireless communication unit 106 may not be included, and thus may be selectively included as appropriate, depending on a combination with a structural component of power supply device 11.
<Display Unit 101>
Display unit 101 is included in a position that is visible when mobile terminal 10 is placed on power supply device 11. As illustrated in FIG. 3A, display unit 101 may be, for example, an LED or a lamp. Alternatively, display unit 101 may be, for example, a display screen, as illustrated as display unit 101A in FIG. 3B. In either case, display unit 101 operates on electric power from secondary battery 107 or electric power from power receiver 102 to provide a display indicating that power receiver 102 is currently receiving electric power. When being an LED, etc., display unit 101 may emit white light, etc., for example, to provide a display indicating that power reception is in progress. Meanwhile, when being a display screen, etc., display unit 101 may indicate that power reception is in progress by an icon to display or by a color of the screen. To indicate that power reception is in progress, display unit 101 may also display a numerical value representing a relative value that is based on a predetermined magnitude of electric power.

Also, under control of display controller 104, display unit 101 provides a display differently in accordance with the magnitude of electric power received by power receiver 102.

More specifically, display unit 101 may provide a display differently when the magnitude of electric power received by power receiver 102 exceeds a predetermined value. For example, display unit 101 may change the colors of the display indicating that power reception is in progress by changing the colors of an LED, etc. or the colors of the display screen, or may change the sizes of the icon being displayed indicating that power reception is in progress. Display unit 101 may further show, on the display indicating that power reception is in progress, a character string, etc. that indicates that the magnitude of electric power received by power receiver 102 has exceeded the predetermined value.

Display unit 101 may also provide a display differently between a case where the magnitude of electric power received by power receiver 102 is increasing and a case where the magnitude of electric power is decreasing. For example, when being an LED, etc., display unit 101 may show green on the LED, etc. when the magnitude of electric power is increasing and may show red on the LED, etc. when the magnitude of electric power is decreasing. Also, when being a display screen, etc., display unit 101 may show a larger icon indicating that power reception is in progress when the magnitude of electric power is increasing and may show a smaller icon when the magnitude of electric power is decreasing.

When showing on the display screen, etc. a numerical value representing the relative value that is based on the predetermined magnitude of electric power, display unit 101 may change the numerical value displayed in accordance with the magnitude of electric power received by power receiver 102. For example, when mobile terminal 10 stores, as a reference, the magnitude of electric power that can be fully charged, i.e., that can be charged at the maximum efficiency in its non-illustrated memory, etc., display unit 101 may change the numerical value displayed representing the relative value that is based on such reference in accordance with the magnitude of electric power received by power receiver 102.

As described above, display unit 101 provides a display differently in accordance with the magnitude of electric power received by power receiver 102, thereby enabling a user of mobile terminal 10 to move mobile terminal 10 to the optimal position with respect to power supply device 11 and thus optimizing a placement position in power supply device 11. Stated differently, the charging efficiency of wireless power supply is further improved by placing mobile terminal 10 on the placement position that achieves the maximum charging efficiency, in accordance with the display provided by display unit 101.

Display unit 101 may also display a guidance to the placement position in power supply device 11 that achieves the maximum charging efficiency, by displaying video of power supply device 11 shot by a camera included on the back surface of mobile terminal 10 and using augmented reality (AR). For example, the guidance may be displayed as follows: mobile terminal 10 previously registers information on the optimal position in power supply device 11; and the display of the optimal position is placed over the actual video of power supply device 11 on the basis of such registered information.

<Power Receiver 102>

Figure 4:
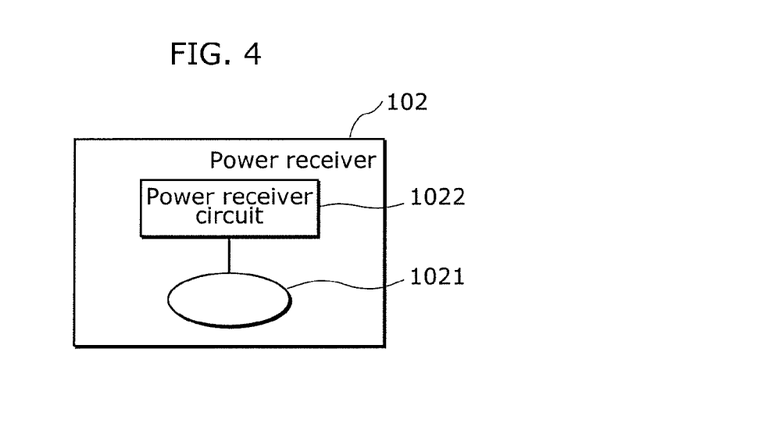
FIG. 4 is a diagram showing an example of a detailed structure of a power receiver illustrated in FIG. 2.

FIG. 4 is a diagram showing an example of a detailed structure of power receiver 102 illustrated in FIG. 2.

Power receiver 102 wirelessly receives electric power, and supplies secondary battery 107 with the received electric power. As illustrated in FIG. 4, for example, power receiver 102 includes power receiver coil 1021 and power receiver circuit 1022.

In an example illustrated in FIG. 1, power receiver coil 1021 is placed to face power transmitter coil 1121 of power supply device 11 when mobile terminal 10 is placed on power supply device 11. When an alternating current (AC) flows through power transmitter coil 1121, power receiver coil 1021 generates an AC under the influence of electromagnetic induction. In power receiver circuit 1022, a rectifier not illustrated rectifies the AC generated by power receiver coil 1021 to a direct current (DC), and a stabilizer power source not illustrated further stabilizes the resulting current. These processes enable the resulting electric power stabilized at a desired voltage to be supplied to secondary battery 107.

Note that the above description provides a non-limited example in which power receiver coil 1021 generates an AC by an electromagnetic induction method. Power receiver coil 1021 may thus generate an AC by the magnetic field resonance method.

<Controller 103>

Controller 103 operates on electric power from secondary battery 107 to control wireless communication unit 106 and display unit 101. Controller 103 is implemented by a collection of a user interface (IF) device, a central processing unit (CPU), a memory, and so forth not illustrated. As illustrated in FIG. 2, controller 103 according to the present embodiment includes display controller 104 and communication controller 105.

«Display Controller 104»

Display controller 104 causes display unit 101 to provide a display differently in accordance with the magnitude of electric power received by power receiver 102. More specifically, display controller 104 may cause display unit 101 to provide a display differently when the magnitude of electric power received by power receiver 102 exceeds the predetermined value, or may cause display unit 101 to provide a display differently between a case where the magnitude of electric power received by power receiver 102 is increasing and a case where the magnitude of electric power is decreasing. Also, when display unit 101 displays a numerical value representing the relative value that is based on the predetermined magnitude of electric power, display controller 104 may cause display unit 101 to change the numerical value displayed in accordance with the magnitude of electric power received by power receiver 102. This enables the user of mobile terminal 10 to move mobile terminal 10 to the optimal position with respect to power supply device 11, thus optimizing the placement position in power supply device 11. As described above, the charging efficiency of wireless power supply is further improved by placing mobile terminal 10 on the placement position that achieves the maximum charging efficiency, in accordance with the display provided by display unit 101.

«Communication Controller 105»

When power receiver 102 is receiving electric power, communication controller 105 may cause wireless communication unit 106 to perform wireless communication using radio waves having the lower radio wave intensity than a predetermined radio wave intensity that is used when power receiver 102 is not receiving electric power. When power receiver 102 is receiving electric power and wireless communication unit 106 is wirelessly communicating with power supply device 11 that is currently transmitting electric power to power receiver 102, communication controller 105 may also cause wireless communication unit 106 to perform wireless communication using radio waves having the lower radio wave intensity than the predetermined radio wave intensity. This is because mobile terminal 10 and power supply device 11 with which mobile terminal 10 is wirelessly communicating are located extremely close with each other when power receiver 102 is receiving electric power, i.e., wireless power supply is in progress, and thus an adequately lowered radio wave intensity is enough to perform wireless communication.

Note that the lower radio wave intensity than the predetermined radio wave intensity falls within a range that is higher than 0 dB and that is higher than the lowest one of the radio wave intensities by which wireless communication can be performed with power supply device 11.

The above structure reduces the electric power consumed by wireless communication unit 106, thus preventing the charging efficiency from becoming lower and the charging time from becoming longer than necessary. Further, mobile terminal 10 reduces the electric power consumed by wireless communication, thus preventing the occurrence of heat generated by performing wireless communication. Stated differently, mobile terminal 10 is also capable of improving the heat radiation effect. As described above, mobile terminal 10 further improves the charging efficiency of wireless power supply.

<Wireless Communication Unit 106>

Wireless communication unit 106 operates on electric power from secondary battery 107 to perform wireless communication. Examples of a wireless communication method used here include Wi-Fi®, Bluetooth®, Zigbee®, and a reflected wave transmission. Wireless communication unit 106 performs wireless communication to, for example, exchange data and transmit video content held by mobile terminal 10. Wireless communication unit 106 transmits data to, i.e., performs wireless communication with, for example, a TV, a PC, or power supply device 11. This enables the transmission of video content held by mobile terminal 10 to, for example, a TV or a PC directly or via power supply device 11. This consequently enables to view the video content on a larger screen than the display screen of mobile terminal 10.

When power receiver 102 is receiving electric power, wireless communication unit 106 performs wireless communication using radio waves having the lower radio wave intensity than the predetermined radio wave intensity that is used when power receiver 102 is not receiving electric power. Here, wireless communication unit 106 may perform wireless communication using radio waves having the lower radio wave intensity than the predetermined radio wave intensity, when power receiver 102 is receiving electric power and wireless communication unit 106 is wirelessly communicating with power supply device 11 that is currently transmitting electric power to power receiver 102.

<Secondary Battery 107>

Secondary battery 107 is capable of use not as a one-time use battery but as a battery that accumulates electric power through charging. Stated differently, secondary battery 107 is a rechargeable battery that allows for a repeated use. Secondary battery 107 according to the present embodiment is charged with electric power supplied from power receiver 102. Secondary battery 107 supplies its electric power to display unit 101, controller 103, wireless communication unit 106, and essential function unit 108 for their operating power.

<Essential Function Unit 108>

Essential function unit 108 performs control that causes mobile terminal 10 to exert the essential functions of mobile terminal 10. When mobile terminal 10 is a smartphone, essential function unit 108 performs control that causes mobile terminal 10 to exert the functions commonly supported by a smartphone, such as web browsing, movie playback, games, application operation, in addition to the calling function and the communication function. When mobile terminal 10 is a speaker, essential function unit 108 performs control that causes mobile terminal 10 to exert the sound playback function and the communication function. As described above, essential function unit 108 is a functional component unit that causes mobile terminal 10 to exert the functions commonly supported.

[Structure of Power Supply Device 11]

Power supply device 11 operates on a commercial power source to wirelessly supply electric power (i.e., transmit electric power) to mobile terminal 10 placed on power supply device 11. Power supply device 11 is, for example, a charger. Power supply device 11 is also not limited to having a flat plate shape as illustrated in FIG. 1, and thus may have a disk shape, for example, so long as power supply device 11 has the capability of wirelessly transmitting electric power from power transmitter coil 1121 to mobile terminal 10. Power supply device 11 illustrated in FIG. 1 includes display unit 111, an example of which is an LED. Display unit 111 emits light, for example, while power supply device 11 is transmitting electric power, i.e., when charging of mobile terminal 10 is in progress, to display such status. Note that display unit 111 is not limited to an LED. This will be described in detail later.

Figure 5:
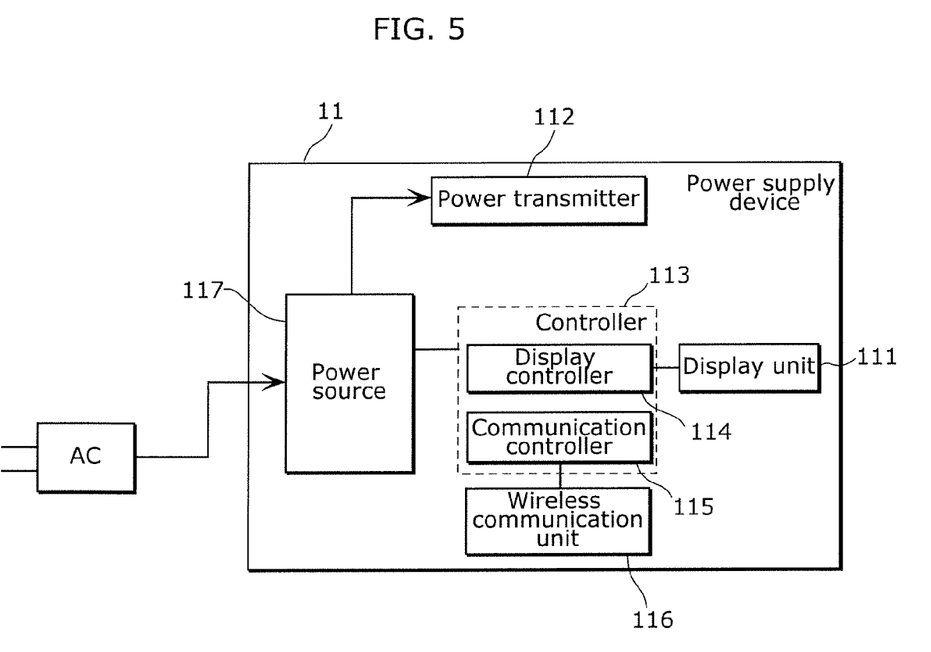
FIG. 5 is a block diagram of an exemplary structure of a power supply device according to Embodiment 1.

FIG. 5 is a block diagram of an exemplary structure of power supply device 11 according to Embodiment 1. As illustrated in FIG. 5, for example, power supply device 11 according to the present embodiment includes display unit 111, power transmitter 112, controller 113, wireless communication unit 116, and power source 117. Note that display unit 111 and wireless communication unit 116 may not be included. For example, display unit 111 may not be included when mobile terminal 10 includes display unit 101, and wireless communication unit 116 may not be included when mobile terminal 10 does not include wireless communication unit 106. Stated differently, these structural components may be selectively included as appropriate, depending on a combination with a structural component of mobile terminal 10.

<Display Unit 111>

As illustrated in FIG. 1, for example, display unit 111 is included in a position that is visible when mobile terminal 10 is placed on power supply device 11. Examples of display unit 111 include an LED and a lamp.

Display unit 111 operates on electric power from power source 117 to provide a display indicating that power transmitter 112 is currently transmitting electric power, i.e., charging of mobile terminal 10 is in progress. For example, display unit 111 may emit white light, etc., to provide a display indicating that power transmission is in progress. Note that display unit 111 is not limited to an LED, etc., and thus may be, for example, a display screen. In this case, display unit 111 may indicate that power transmission is in progress by an icon to display or by a color of the screen as in the case of display unit 101. To indicate that power transmission is in progress, display unit 111 may also display a numerical value representing a relative value that is based on a predetermined magnitude of electric power.

Also, under control of display controller 114, display unit 111 provides a display differently in accordance with the magnitude of electric power transmitted from power transmitter 112. More specifically, display unit 111 may provide a display differently when the magnitude of electric power transmitted by power transmitter 112 exceeds a predetermined value. Display unit 111 may also provide a display differently between a case where the magnitude of electric power transmitted by power transmitter 112 is increasing and a case where the magnitude of electric power is decreasing. When showing on the display screen, etc. a numerical value representing the relative value that is based on the predetermined magnitude of electric power, display unit 111 may change the numerical value displayed in accordance with the magnitude of electric power transmitted by power transmitter 112. Note that the descriptions of display unit 101 are applicable to display unit 111, and thus the description of specific illustration of display unit 111 will be omitted.

As described above, display unit 111 provides a display differently in accordance with the magnitude of electric power transmitted by power transmitter 112, thereby enabling the user of mobile terminal 10 to move mobile terminal 10 to the optimal position with respect to power supply device 11. As described above, the charging efficiency of wireless power supply is further improved by placing mobile terminal 10 on the placement position that achieves the maximum charging efficiency in accordance with the display provided by display unit 111.

<Power Transmitter 112>

Figure 6:
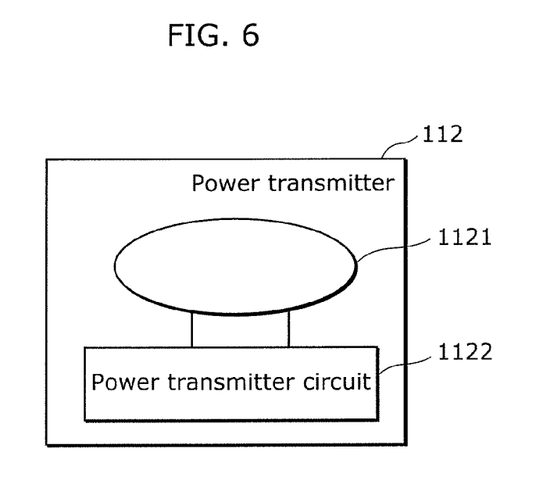
FIG. 6 is a diagram showing an example of a detailed structure of a power transmitter illustrated in FIG. 5.

FIG. 6 is a diagram showing an example of a detailed structure of power transmitter 112 illustrated in FIG. 5.

Power transmitter 112 operates on electric power from power source 117 to wirelessly transmit electric power to mobile terminal 10. As illustrated in FIG. 6, for example, power transmitter 112 includes power transmitter coil 1121 and power transmitter circuit 1122.

Power transmitter circuit 1122 generates high-frequency power used for wireless power supply, upon receipt of operating power from power source 117. Power transmitter circuit 1122 supplies (applies) the generated high-frequency power to power transmitter coil 1121 via, for example, a waveform converter circuit not illustrated.

In an example shown in FIG. 1, power transmitter coil 1121 is placed to face power receiver coil 1021 of mobile terminal 10 when mobile terminal 10 is placed on power supply device 11. An AC flows through power transmitter coil 1121 upon receipt of the high-frequency power supplied from power transmitter circuit 1122. Note that power transmitter coil 1121 may generate an AC by an electromagnetic induction method or by a magnetic field resonance method.

<Controller 113>

Controller 113 operates on electric power from power source 117 to control wireless communication unit 116 and display unit 111. Controller 113 is implemented by a collection of a user IF device, a CPU, a memory, and so forth not illustrated. As illustrated in FIG. 5, controller 113 according to the present embodiment includes display controller 114 and communication controller 115.

«Display Controller 114»

Display controller 114 causes display unit 111 to provide a display differently in accordance with the magnitude of electric power transmitted by power transmitter 112. More specifically, display controller 114 may cause display unit 111 to provide a display differently when the magnitude of electric power transmitted by power transmitter 112 exceeds the predetermined value, or may cause display unit 111 to provide a display differently between a case where the magnitude of electric power transmitted by power transmitter 112 is increasing and a case where the magnitude of electric power is decreasing. Also, when display unit 111 displays a numerical value representing the relative value that is based on the predetermined magnitude of electric power, display controller 114 may cause display unit 111 to change the numerical value displayed in accordance with the magnitude of electric power transmitted by power transmitter 112.

This enables the user of mobile terminal 10 to move mobile terminal 10 to the optimal position with respect to power supply device 11. As described above, the charging efficiency of wireless power supply is further improved by placing mobile terminal 10 on the placement position that achieves the maximum charging efficiency, in accordance with the display provided by display unit 111.

«Communication Controller 115»

When power transmitter 112 is transmitting electric power to mobile terminal 10, communication controller 115 may cause wireless communication unit 116 to perform wireless communication using radio waves having the lower radio wave intensity than a predetermined radio wave intensity that is used when power transmitter 112 is not transmitting electric power. Further, when power transmitter 112 is transmitting electric power and wireless communication unit 116 is wirelessly communicating with mobile terminal 10, communication controller 115 may also cause wireless communication unit 116 to perform wireless communication using radio waves having the lower radio wave intensity than the predetermined radio wave intensity. This is because power supply device 11 and mobile terminal 10 with which power supply device 11 is wirelessly communicating are located extremely close with each other when power transmitter 112 is transmitting electric power, i.e., wireless power supply is in progress, and thus an adequately lowered radio wave intensity is enough to perform wireless communication.

Note that the lower radio wave intensity than the predetermined radio wave intensity falls within a range that is higher than 0 dB and that is higher than the lowest one of the radio wave intensities by which wireless communication can be performed with mobile terminal 10.

The above structure also lowers the intensity of radio waves used by mobile terminal 10 for wireless communication, when power supply device 11 is wirelessly communicating with mobile terminal 10, and thus reduces the electric power consumed by mobile terminal 10 for wireless communication. Consequently, the present disclosure prevents the efficiency of charging mobile terminal 10 from becoming lower, thus preventing the time taken for charging from becoming longer than necessary. Further, reduction in the electric power consumed by mobile terminal 10 for wireless communication prevents the occurrence of heat generated by mobile terminal 10 for performing wireless communication. Stated differently, the present disclosure is also capable of improving the heat radiation effect. As described above, a further improvement is achieved in the efficiency of charging mobile terminal 10 by wireless power supply.

<Wireless Communication Unit 116>

Wireless communication unit 116 operates on electric power from power source 117 to perform wireless communication. Examples of a wireless communication method used here include, as described above, Wi-Fi®, Bluetooth®, Zigbee®, and a reflected wave transmission. Wireless communication unit 116 is capable of wirelessly communicating with mobile terminal 10 and at the same time with another device such as a TV and a PC. For example, wireless communication unit 116 may wirelessly communicate with mobile terminal 10 by Bluetooth®, while wirelessly communicating with a TV, for example, by Wi-Fi®. Stated differently, wireless communication unit 116 has the function of relaying data exchange with mobile terminal 10 and transmission of video content held by mobile terminal 10. Wireless communication unit 116 transmits data to, i.e., performs wireless communication with, for example, a TV, a PC, or mobile terminal 10. This enables the transmission of video content held by mobile terminal 10 to, for example, a TV or a PC directly or via power supply device 11. This consequently enables to view the video content on a larger screen than the display screen of mobile terminal 10.

When power transmitter 112 is transmitting electric power to mobile terminal 10, wireless communication unit 116 performs wireless communication using radio waves having the lower radio wave intensity than the predetermined radio wave intensity that is used when power transmitter 112 is not transmitting electric power. Here, wireless communication unit 116 may perform wireless communication using radio waves having the lower radio wave intensity than the predetermined radio wave intensity, when power transmitter 112 is transmitting electric power and wireless communication unit 116 is wirelessly communicating with mobile terminal 10.

<Power Source 117>

Power source 117 includes an AC cable connectable to a commercial power source. Power source 117 converts an AC from the commercial power source to a DC, and supplies the DC to display unit 111, controller 113, and wireless communication unit 116 as their operating power.

[Effect, Etc.]

Figure 7:
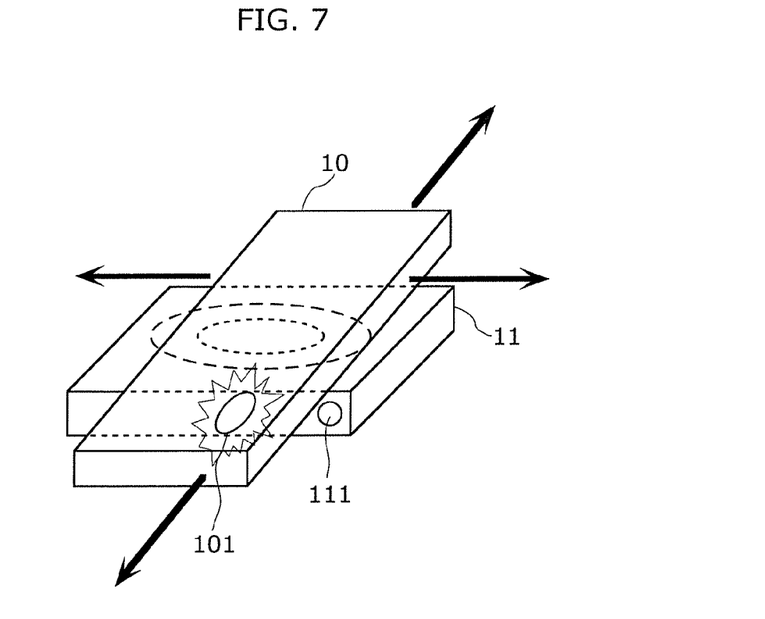
FIG. 7 is a diagram for explaining an effect achieved by Embodiment 1.
Figure 8:
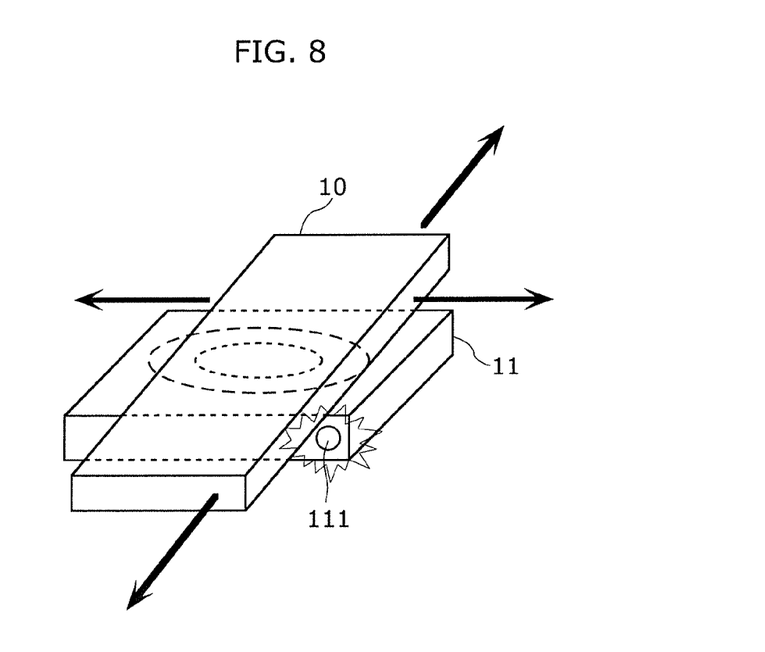
FIG. 8 is a diagram for explaining an effect achieved by Embodiment 1.

FIG. 7 and FIG. 8 are diagrams for explaining the effects achieved by Embodiment 1.

As illustrated in FIG. 7, for example, display unit 101 of mobile terminal 10 provides a display differently in accordance with the magnitude of electric power to receive. Alternatively, as illustrated in FIG. 8, for example, display unit 111 of power supply device 11 provides a display differently in accordance with the magnitude of electric power to transmit. This enables the user of mobile terminal 10 to move mobile terminal 10 to the optimal position with respect to power supply device 11 by checking changes shown by display unit 101 or display unit 111, and thus to optimize the placement position in power supply device 11. Stated differently, by checking changes shown by display unit 101 or display unit 111, the user of mobile terminal 10 can find the sweet spot, which is the placement position that achieves the maximum efficiency of charging mobile terminal 10. As described above, the charging efficiency of wireless power supply is further improved by placing mobile terminal 10 on the sweet spot that has been found in accordance with the display provided by display unit 101 or display unit 111.

Here, assume the case where the user has placed mobile terminal 10 on power supply device 11 and charging has started when mobile terminal 10 is transmitting video content, etc. to, for example, a TV directly or via power supply device 11 by wireless communication. In this case, under control of power supply device 11 or the mobile terminal itself, mobile terminal 10 performs the wireless communication using radio waves having the lower radio wave intensity than the predetermined radio wave intensity that is used when charging is not in progress. This reduces the electric power consumed by mobile terminal 10, thus preventing the charging efficiency from becoming lower and the charging time from becoming longer than necessary. Stated differently, the efficiency of charging mobile terminal 10 by wireless power supply is further improved. Further, reduction in the electric power consumed by mobile terminal 10 for wireless communication prevents the occurrence of heat generated by performing the wireless communication. Stated differently, the present disclosure is also capable of improving the heat radiation effect.

As described above, mobile terminal 10 and power supply device 11 according to the present embodiment further improve the efficiency of charging mobile terminal 10 by wireless power supply.

The above description has illustrated a non-limited example in which the structure of mobile terminal 10 or power supply device 11 achieves a further improvement in the efficiency of charging mobile terminal 10 by wireless power supply. A further improvement in the efficiency of charging mobile terminal 10 by wireless power supply may thus be achieved by the control method of controlling mobile terminal 10. Such control method is a control method of controlling mobile terminal 10 that operates on secondary battery 107. This control method includes: (i) causing mobile terminal 10 to wirelessly receive electric power and supply secondary battery 107 with the electric power received; (ii) causing mobile terminal 10 to provide a display indicating that the electric power is being received in (i); and (iii) causing mobile terminal 10 to provide the display differently in accordance with magnitude of the electric power received in (i).

Embodiment 2

Embodiment 1 has described an unlimited example in which mobile terminal 10 is charged by being placed on the top surface of power supply device 11. The mobile terminal may also be charged in a levitated state above power supply device 11. This will be described below as Embodiment 2. The following description focuses on differences from Embodiment 1.

[Structure, Etc.]

Figure 9:
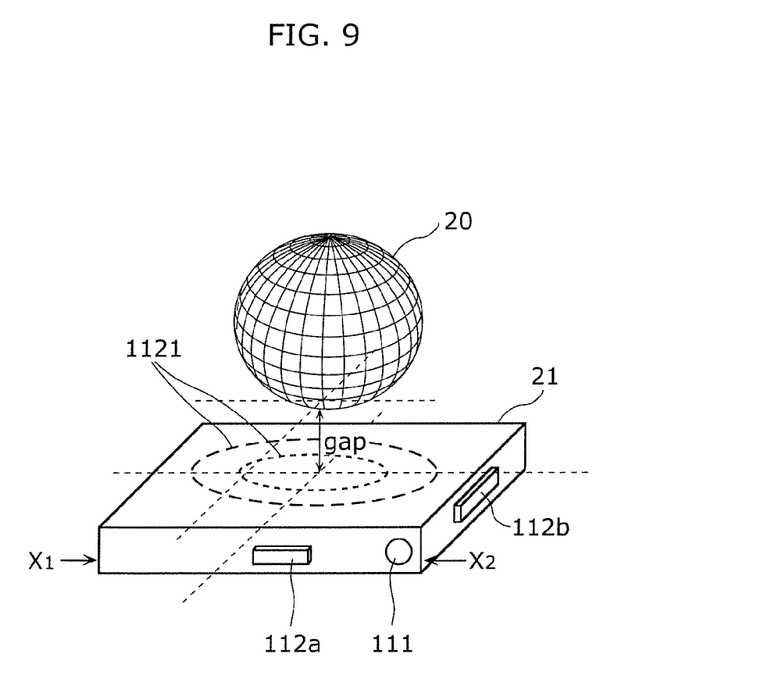
FIG. 9 is a diagram illustrating an exemplary scene in which a mobile terminal according to Embodiment 2 is being charged.

FIG. 9 is a diagram illustrating an exemplary scene in which mobile terminal 20 according to Embodiment 2 is being charged. FIG. 9 illustrates a scene in which mobile terminal 20 is being charged with electric power from power supply device 21 that is not connected (wirelessly connected) by being kept levitated above power supply device 21.

[Mobile Terminal 20]

As illustrated in FIG. 9, mobile terminal 20 is different from mobile terminal 10 according to Embodiment 1 in shape and in that mobile terminal 20 is kept levitated at a predetermined position above the body of power supply device 21. More specifically, mobile terminal 20 is not limited to having a spherical shape as illustrated in FIG. 9, and thus may have a disk shape or a semispherical shape. Stated differently, mobile terminal 20 may have any shape that enables mobile terminal 20 to remain levitated at the predetermined position above the body of power supply device 21. Mobile terminal 20 includes a second magnetic body (not illustrated) that is placed to enable mobile terminal 20 to remain levitated at the predetermined position above the body of power supply device 21. Here, the second magnetic body includes, for example, one or more permanent magnets, which may be placed inside of mobile terminal 20 or may be attached to mobile terminal 20 via a holder.

The other structural components are similar to those of mobile terminal 10 including, for example, that such structural components operate on the secondary battery, and thus their detailed descriptions will be omitted. This is also applicable to the point that display unit 101 and wireless communication unit 106 may not be included, and thus may be selectively included as appropriate, depending on a combination with a structural component of power supply device 21.

[Power Supply Device 21]

As illustrated in FIG. 9, power supply device 21 is different from power supply device 11 according to Embodiment 1 in that power supply device 21 is capable of keeping mobile terminal 20 levitated at the predetermined position above the body of power supply device 21 and in that at least power transmitter coil 1121 is movable. More specifically, power supply device 21 includes first magnetic body 218 that is placed to enable mobile terminal 20 to remain levitated at the predetermined position above the body of power supply device 21. Power supply device 21 also has a mechanism that enables at least power transmitter coil 1121 to be movable, such as sliders 112a and 112b. Note that the other structural components are similar to those of power supply device 11, and thus their descriptions will be omitted. Display unit 111 and wireless communication unit 116 may not be included, and thus may be selectively included as appropriate, depending on a combination with a structural component of mobile terminal 20.

Figure 10A:
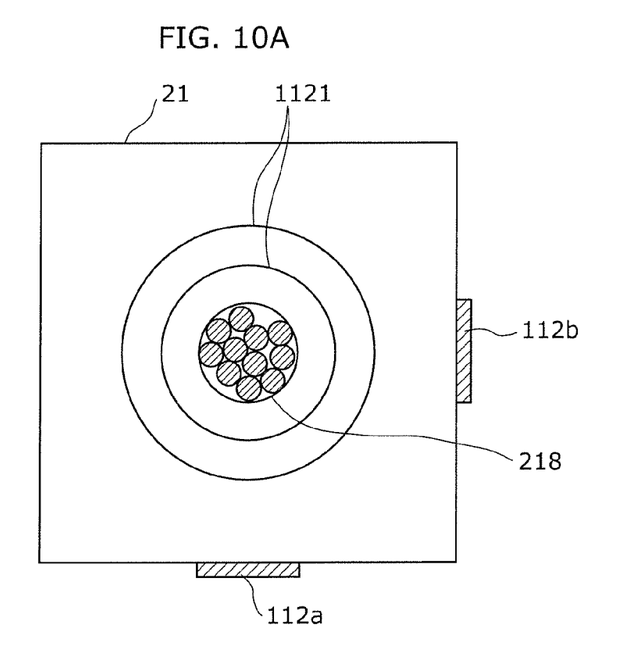
FIG. 10A is a diagram showing an exemplary cross-section cut along X1-X2 of a power supply device according to Embodiment 2.
Figure 10B:
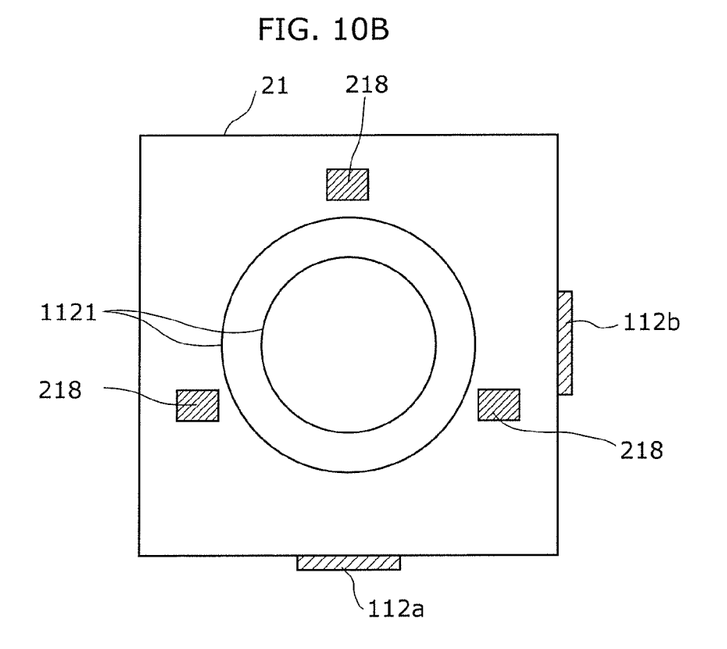
FIG. 10b is a diagram showing an exemplary cross-section cut along X1-X2 of the power supply device according to Embodiment 2.
Figure 11:
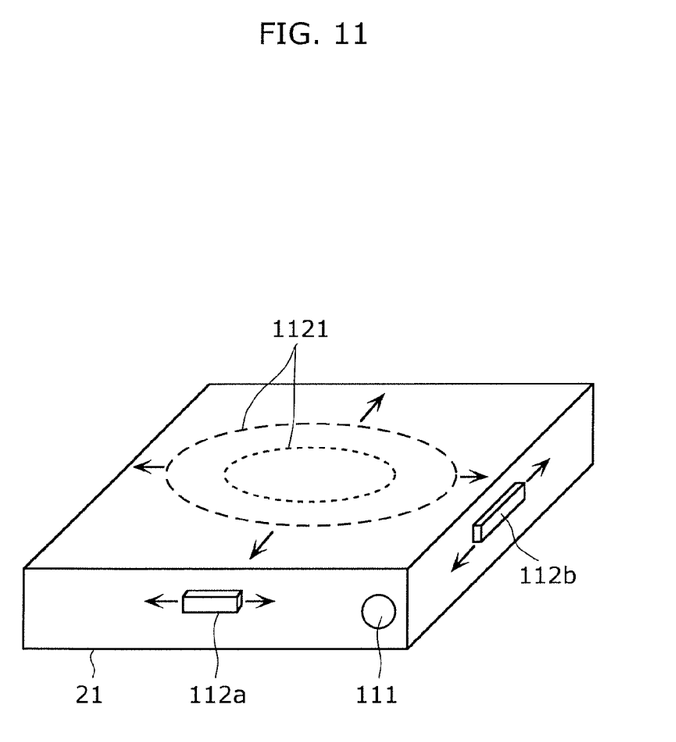
FIG. 11 is a diagram for conceptually explaining that a power transmitter coil of the power supply device according to Embodiment 2 is movable.

FIG. 10A and FIG. 10B are diagrams showing exemplary cross-sections cut along X1-X2 of power supply device 21 according to Embodiment 2. FIG. 11 is a diagram for conceptually explaining that power transmitter coil 1121 of power supply device 21 according to Embodiment 2 is movable.

First magnetic body 218, which includes one or more permanent magnets, for example, has different magnetic properties from those of the second magnetic body placed in mobile terminal 20. First magnetic body 218 keeps mobile terminal 20 levitated at the predetermined position above the body of power supply device 21.

Here, as illustrated in FIG. 10A, first magnetic body 218 may be included inside of power transmitter coil 1121 in a top view. Alternatively, as illustrated in FIG. 10B, there may be a plurality of first magnetic bodies 218 that are placed at three or more points outside of power transmitter coil 1121 in a top view. First magnetic bodies 218 may certainly be placed in a circular pattern outside of power transmitter coil 1121. In either case, any placement, arrangement, and shape may be employed for first magnetic body 218 that enable mobile terminal 20 to remain levitated at the predetermined position above the body of power supply device 21. The predetermined position refers to a position that is defined by optimizing the positions of mobile terminal 20 and power supply device 21, i.e., the positions of and the intervals between the power receiver coil of mobile terminal 20 and the power transmitter coil of power supply device 21. Such optimal position is a position that achieves the maximum charging efficiency of wireless power supply to mobile terminal 20.

Sliders 112a and 112b are a mechanism that enables at least power transmitter 112 including power transmitter coil 1121 to be movable. Stated differently, in the body of power supply device 21, power transmitter 112 can change its position relative to the first magnetic body.

More specifically, as illustrated in FIG. 9 and FIG. 11, for example, sliders 112a and 112b are placed at sides of power supply device 21 in a physically movable manner. Such sliders 112a and 112b enable at least power transmitter 112 including power transmitter coil 1121 to be movable relative to the first magnetic body. There is a case, for example, that a displacement occurs at the predetermined position above the body of power supply device 21 at which first magnetic body 218 keeps mobile terminal 20 levitated, as a result of which such predetermined position cannot serve as the position that achieves the maximum charging efficiency of wireless power supply to mobile terminal 20. In such a case, the movement of sliders 112a and 112b enables at least power transmitter coil 1121 to move relative to the first magnetic body, thus enabling the predetermined position to serve as the position defined by optimizing the positions of the power receiver coil of mobile terminal 20 and the power transmitter coil of power supply device 21. Stated differently, power supply device 21 that includes sliders 112a and 112b enables the user of mobile terminal 20 to adjust the predetermined position so that such position serves to achieve the maximum efficiency of charging mobile terminal 20, while checking changes shown by display unit 101 or display unit 111.

Note that sliders 112a and 112b may take any form that enables at least power transmitter coil 1121 to be movable relative to the first magnetic body. Sliders 112a and 112b are simply required to be capable of adjusting the position of power transmitter coil 1121 relative to the first magnetic body by enabling power transmitter 112 that includes power transmitter coil 1121 to be movable.

[Effect, Etc.]

As described above, with mobile terminal 20 and power supply device 21 according to the present embodiment, a mechanism that allows the movement of the position of power transmitter coil 1121 enables to adjust the predetermined position so that such position serves to achieve the maximum efficiency of charging mobile terminal 20. Stated differently, the present disclosure further improves the efficiency of charging mobile terminal 20 by wireless power supply.

Further, with mobile terminal 20 and power supply device 21 according to the present embodiment, mobile terminal 20 is kept levitated to be charged. Consequently, the gap between mobile terminal 20 and power supply device 21 enables the heat of mobile terminal 20 and power supply device 21 generated by charging mobile terminal 20 to be further released (enables heat radiation) and prevents the heat of power supply device 21 from being transferred to mobile terminal 20. Stated differently, the present disclosure prevents a decrease in the efficiency of charging mobile terminal 20 caused by heat.

As described above, mobile terminal 20 and power supply device 21 according to the present embodiment further improve the efficiency of charging mobile terminal 20 by wireless power supply.

The mobile terminal and the power supply device according to one or more aspects of the present disclosure have been described above on the basis of the embodiments and so forth, but the present disclosure is not limited to such embodiments. For example, an embodiment achieved by freely combining structural components described in the present specification or an embodiment achieved by eliminating one or more of the structural components described in the present specification may serve as an embodiment of the present disclosure. Further, the present disclosure also includes a variation achieved by making various modifications and alternations to the above embodiments that can be conceived by those skilled in the art without departing from the essence of the present disclosure, i.e., the meaning of the language recited in Claims.

The scope of one or more aspects of the present disclosure may also include:

(1) One or more of the structural components included in each of the mobile terminal and the power supply device described above may be implemented as a computer system that includes a microprocessor, a ROM, a RAM, a hard disk unit, a display unit, a keyboard, a mouse, and so forth. The RAM or the hard disk unit stores a computer program. The microprocessor's operating in according with such computer program enables to achieve its function. Here, the computer program is a collection of command codes that indicate instructions to the computer for achieving a predetermined function;

(2) One or more of the structural components included in each of the mobile terminal and the power supply device described above may be implemented as a single system large scale integration (LSI). A system LSI is a super-multifunctional LSI fabricated by integrating a plurality of structural components on a single chip. The system LSI is more specifically a computer system that includes a microprocessor, a ROM, a RAM, and so forth. The RAM stores a computer program. The microprocessor's operating in accordance with the computer program enables the system LSI to achieve its function;

(3) One or more of the structural components included in each of the mobile terminal and the power supply device described above may be implemented as an integrated circuit (IC) card or a single module removable from each of the devices. The IC card or the module is a computer system that includes a microprocessor, a ROM, a RAM and so forth. The IC card or the module may include the super-multifunctional LSI described above. The microprocessor's operating in accordance with a computer program enables the IC card or the module to achieve its function. Such IC card or module may be tamper resistant;

(4) One or more of the structural components included in each of the mobile terminal and the power supply device described above may be implemented as the computer program or digital signals recorded on a computer-readable recording medium such as a flexible disk, a hard disk, a CD-ROM, an MO, a DVD, a DVD-ROM, a DVD-RAM, a Blu-ray® disc (BD), and a semiconductor memory. One or more of the structural components included in each of the mobile terminal and the power supply device described above may also be digital signals recorded in such recording medium;

One or more of the structural components included in each of the mobile terminal and the power supply device described above may transmit the computer program or the digital signals via, for example, a telecommunication line, a wireless or wired communication line, a network represented by the Internet, and data broadcasting;

(5) The present disclosure may also be the above-described method. The present disclosure may also be a computer program that enables such method to be implemented by a computer, or digital signals that form the computer program;

(6) The present disclosure may also be a computer system that includes a microprocessor and a memory, in which the memory may store the computer program and the microprocessor may operate in accordance with the computer program;

(7) The present disclosure may also be achieved by transmitting the program or the digital signals recorded on the recording medium or by transmitting the program or the digital signals via, for example, the network, thereby enabling another independent computer system to carry out the present disclosure; and (8) The above embodiments may be combined.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable for use as a mobile terminal such as a mobile phone, a smartphone, a tablet, and a speaker that is wirelessly supplied with electric power, and a power supply device and so forth that perform wireless power supply.

The invention claimed is:

1. A mobile terminal that operates on a secondary battery, the mobile terminal comprising:
   a power receiver that wirelessly receives electric power, and supplies the secondary battery with the electric power received;
   a display unit that provides a display indicating that the power receiver is receiving the electric power; and
   a display controller that causes the display unit to provide the display differently in accordance with magnitude of the electric power received by the power receiver,
   wherein the display controller causes the display unit to display a first color in a case where the magnitude of the electric power received by the power receiver is increasing and to display a second color which is different from the first color in a case where the magnitude of the electric power received by the power receiver is decreasing.

2. The mobile terminal according to claim 1, wherein the display controller causes the display unit to provide the display differently when the magnitude of the electric power received by the power receiver exceeds a predetermined value.

3. The mobile terminal according to claim 1,
   wherein the display unit provides the display that shows a numerical value representing a relative value that is based on a predetermined magnitude of electric power, and
   the display controller causes the display unit to change the numerical value displayed in accordance with the magnitude of the electric power received by the power receiver.

4. A mobile terminal that operates on a secondary battery, the mobile terminal comprising:
   a power receiver that wirelessly receives electric power from a power supply device, and supplies the secondary battery with the electric power received; and
   a wireless communication unit that performs wireless communication to receive and/or transmit digital data with the power supply device,
   wherein when the power receiver is receiving the electric power, the wireless communication unit performs the wireless communication by transmitting radio waves having a lower radio wave intensity than a predetermined radio wave intensity that is used when the power receiver is not receiving the electric power.

5. The mobile terminal according to claim 4, wherein the wireless communication unit performs the wireless communication using the radio waves having the lower radio wave intensity than the predetermined radio wave intensity, when the power receiver is receiving the electric power and the wireless communication unit is performing the wireless communication with a power supply device that is currently transmitting the electric power to the power receiver.

6. A power supply device comprising:
   a power transmitter that wirelessly transmits electric power to a mobile terminal; and
   a wireless communication unit that performs wireless communication to receive and/or transmit digital data with the mobile terminal,
   wherein when the power transmitter is transmitting the electric power to the mobile terminal, the wireless communication unit performs the wireless communication by receiving radio waves having a lower radio wave intensity than a predetermined radio wave intensity that is used when the power transmitter is not transmitting the electric power.

7. The power supply device according to claim 6, wherein the wireless communication unit performs the wireless communication using the radio waves having the lower radio wave intensity than the predetermined radio wave intensity, when the power transmitter is transmitting the electric power and the wireless communication unit is performing the wireless communication with the mobile terminal.

8. A power supply device comprising:
   a power transmitter that is located in a body of the power supply device, and wirelessly transmits electric power to a mobile terminal;
   a first magnetic body that is located in the body, keeps the mobile terminal levitated at a predetermined position above the body, and has magnetic properties different from magnetic properties of a second magnetic body placed in the mobile terminal; and
   a slider that changes a position of the power transmitter relative to the first magnetic body in the body of the power supply device.

9. A control method of controlling a mobile terminal that operates on a secondary battery, the control method comprising:
   (i) causing the mobile terminal to wirelessly receive electric power and supply the secondary battery with the electric power received;
   (ii) causing the mobile terminal to provide a display indicating that the electric power is being received in (i); and
   (iii) causing the mobile terminal to provide the display differently in accordance with magnitude of the electric power received in (i),
   wherein the display controller causes the display unit to display a first color in a case where the magnitude of the electric power received by the power receiver is increasing and to display a second color which is different from the first color in a case where the magnitude of the electric power received by the power receiver is decreasing.

10. The mobile terminal according to claim 4, wherein the digital data is video data.

11. The power supply device according to claim 6, wherein the digital data is video data.

* * * * *